(12) United States Patent
Ooiwa (10) Patent No.: US 7,564,159 B2
(45) Date of Patent: Jul. 21, 2009

(54) STRUCTURE OF AUTOMOTIVE ALTERNATOR

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 308 days.

(21) Appl. No.: 11/405,505

(22) Filed: Apr. 18, 2006

(65) Prior Publication Data

US 2006/0232157 A1    Oct. 19, 2006

(30) Foreign Application Priority Data

Apr. 18, 2005    (JP)    ............................. 2005-120388

(51) Int. Cl.
  *H02K 1/00*    (2006.01)
(52) U.S. Cl. ...................... 310/179; 310/201
(58) Field of Classification Search ......... 310/179–180, 310/71, 184, 201, 260; 29/596
  See application file for complete search history.

(56) References Cited

U.S. PATENT DOCUMENTS

| | | | |
|---|---|---|---|
| 5,936,326 A | 8/1999 | Umeda et al. | |
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,181,043 B1 | 1/2001 | Kusase et al. | |
| 6,181,045 B1 | 1/2001 | Umeda et al. | |
| 6,198,190 B1 | 3/2001 | Umeda et al. | |
| 6,208,058 B1 * | 3/2001 | Taji et al. ..................... | 310/201 |
| 6,291,918 B1 | 9/2001 | Umeda et al. | |
| 6,388,358 B1 * | 5/2002 | Umeda et al. ............... | 310/201 |
| 6,403,921 B1 | 6/2002 | Maeda et al. | |
| 6,424,071 B1 | 7/2002 | Oohashi et al. | |
| 6,448,681 B1 | 9/2002 | Matsunaga et al. | |
| 6,459,177 B1 | 10/2002 | Nakamura et al. | |
| 6,459,186 B1 | 10/2002 | Umeda et al. | |
| 6,462,453 B1 * | 10/2002 | Asao et al. .................. | 310/179 |

(Continued)

FOREIGN PATENT DOCUMENTS

JP    A-2000-295821    10/2000

(Continued)

*Primary Examiner*—Michael C Zarroli
(74) *Attorney, Agent, or Firm*—Oliff & Berridge PLC (57) ABSTRACT

An automotive alternator has a stator winding that is made up of a plurality of U-shaped conductor segments wound through slots in a stator core. Each of the U-shaped conductor segments is connected at one end thereof to an other end of one of the U-shaped conductor segments through a joint. Some of the joints are each elongated from tips of connected two of the conductor segments in an axial direction of the stator core to have a longitudinal sectional area much greater than a transverse sectional area of the conductor segments and function as radiator fins to dissipate heat from the stator winding.

24 Claims, 10 Drawing Sheets

U.S. PATENT DOCUMENTS

| | | |
|---|---|---|
| 6,490,779 B1 | 12/2002 | Tokizawa et al. |
| 6,501,206 B2 * | 12/2002 | Oohashi et al. ............. 310/184 |
| 6,566,781 B2 * | 5/2003 | Oohashi et al. ............. 310/216 |
| 6,700,282 B2 * | 3/2004 | Mori et al. .................. 310/208 |
| 6,717,317 B2 * | 4/2004 | Akita et al. ................. 310/184 |
| 6,894,415 B2 * | 5/2005 | Koike ......................... 310/184 |
| 6,915,556 B2 * | 7/2005 | Lenoir et al. .................. 29/596 |
| 6,990,724 B2 | 1/2006 | Tamura et al. |
| 7,005,773 B2 * | 2/2006 | Nakamura ................. 310/180 |
| 2002/0041129 A1 | 4/2002 | Oohashi et al. |
| 2003/0024101 A1 | 2/2003 | Tokizawa et al. |

FOREIGN PATENT DOCUMENTS

| | | |
|---|---|---|
| JP | A 2000-299950 | 10/2000 |
| JP | A-2000-350421 | 12/2000 |
| JP | A 2001-054247 | 2/2001 |
| JP | A 2001-054263 | 2/2001 |
| JP | A 2001-238386 | 8/2001 |
| JP | A 2001-298888 | 10/2001 |
| JP | A 2002-119003 | 4/2002 |
| JP | A 2003-219614 | 7/2003 |
| JP | B2 3456140 | 8/2003 |
| JP | A 2004-048939 | 2/2004 |
| WO | WO 92/06527 | 4/1992 |

* cited by examiner

STRUCTURE OF AUTOMOTIVE ALTERNATOR

CROSS REFERENCE TO RELATED DOCUMENT

The present application claims the benefit of Japanese Patent Application No. 2005-120388 filed on Apr. 18, 2005, the disclosure of which is incorporated herein by reference.

BACKGROUND OF THE INVENTION

1. Technical Field of the Invention

The present invention relates generally to an alternator which may be installed in passenger automobiles or autotrucks, and more particularly to such an alternator designed to have enhanced cooling ability to cool a stator winding.

2. Background Art

International Patent Publication No. WO9206527A1 discloses an automotive alternator which is equipped with a stator having a winding formed by a plurality of U-shaped conductor segments joined together. The formation of the winding is achieved by inserting the conductor segments into slots of a stator core from one of opposed ends of the stator core and joining ends of the conductor segments extending from the other end of the stator core. This type of winding has the advantage that the space factor of the conductor segments in the slots of the stator core is improved as compared with a winding formed by turns of a single conductor, which results in a decreased electrical resistance of the winding, thus decreasing the heat generated in the winding. Use of the conductor segments enables turns of the winding to be arranged regularly, thereby minimizing physical interference between portions (which will also be referred to below as coil ends) of the conductor segments extending outside the ends of the stator core and enhancing the efficiency of flows of cooling air through the coil ends. This permits the length of the coil ends to be decreased, thereby further reducing the electrical resistance of the winding or the amount of heat generated in the winding.

Japanese Patent No. 3456140, assigned to the same assignee as that of this application, discloses an alternator equipped with a stator winding which is wound in a stator core to have a stator blade-shape at the coil ends, thereby improving the cooling ability of the alternator to cool the stator winding.

The use of the conductor segments in making the stator winding as taught in the former publication enables high-power small-sized automotive alternators to be made. Such a type of alternator is, however, still required to enhance the cooling ability to cool the stator winding in order to increase the output power further. This may be achieved by forming radiator fins on the coil ends of the conductor segments to cool the coil ends effectively.

In the case where the radiator fins are formed by extending the ends of the conductor segments connected by joining only tips of the ends, as disclosed in the latter publication, to be long outside one of the axially opposed ends of the stator core, the cooling ability is enhanced, but however, the increased length of the conductor segments leads to increases in electrical resistance thereof and amount of heat generated. This results in the disadvantages that the temperature of the stator winding is not reduced sufficiently and an increased copper loss causes torque required by the alternator to rise, thus leading to a decrease in efficiency of generation of electricity in the alternator.

Japanese Patent First Publication No. 2001-238386 that is an equivalent of U.S. Pat. No. 6,448,681 discloses an alternator equipped with a stator winding made of conductor segments connected by electrically welding tips of ends of the conductor segments extending outside an end of a stator core. This type of alternator, however, like the structure taught in the above Japanese Patent No. 3456140, has the problem of increase in electrical resistance of the stator winding.

SUMMARY OF THE INVENTION

It is therefore a principal object of the invention to avoid the disadvantages of the prior art.

It is another object of the invention to provide an improved structure of an alternator for vehicles designed to have enhanced cooling ability to cool a stator winding made up of a plurality of conductor segments.

According to one aspect of the invention, there is provided an alternator which may be employed in automotive vehicles. The alternator comprises: (a) a rotor; (b) a stator disposed around the rotor, the stator including a stator core in which a plurality of slots are formed, the stator core having ends opposed to each other in an axial direction of the stator; and (c) a stator winding wound through the slots of the stator core. The stator winding is made up of a plurality of conductor segments. Each of the conductor segments includes an in-slot portion disposed in one of the slots and an end portion extending from the in-slot portion outside one of the ends of the stator core. The end portions are broken down into at least a first and a second group. Each of the end portions of the first group is connected to one of the end portions of the first group through a first joint. Each of the end portions of the second group is connected to one of the end portions of the second group through a second joint. Each of the first joints is elongated in the axial direction of the stator core to have a longitudinal sectional area which is 1.5 times or more greater than a transverse sectional area of the conductor segments.

Specifically, the first joints have a length in the axial direction of the stator core, thereby causing induced current, as produced in the conductor segments, to flow through the first joints without reaching the tips of the conductor segments, thus minimizing the length of an electrical path in the conductor segments through which the induced current flows. This results in no increase in electrical resistance of the first group of the conductor segments to the flow of the induced current. The longitudinal sectional area of the first joints is greater than the transverse sectional area of the conductor segments, thereby resulting in no increase in electrical resistance in the first joints. This causes a portion of the first group of the conductor segments to function as a radiator fin to dissipate heat from the conductor segments.

In the preferred mode of the invention, the first group of the end portions connected through the first joints are longer than the second group of the end portions connected through the second joints, and therefore the first group of the end portions extends further from the stator core than the second group of the end portions in the axial direction of the stator core. This results in an increased surface area of the radiator fin to enhance the cooling ability thereof. The distance between one of opposed ends of each of the first joints closer to an end of the stator core and the end of the stator core is substantially equal to that between one of the opposed ends of each of the second joints closer to the end of the stator core and the end of the stator core. This minimizes a path in the conductor segments belonging to the first group through which the induced current flows regardless of the projection of the first group of the end portions.

The alternator may further include a frame which embraces the stator and to which the stator core of the stator is so secured as to locate the end portions of the conductor segments at a given interval away from a wall of the frame. Joined pairs of the end portions are disposed on the end of the stator core in a plurality of annular arrays so that the first joints lie on one of the annular arrays other than an outermost one. This ensures desired volumes of paths through which air entering from outside the frame flows to cool the stator winding effectively and also decreasing generation of electric erosion between the frame that is at a ground potential and the ends of the conductor segments that are at higher potentials.

The alternator may further include a cooling fan mounted on one of ends of the stator which are opposed to each other in an axial direction of the stator. The cooling fan works to feed cooling air to the end portions of the conductor segments.

According to the second aspect of the invention, there is provided an alternator for a vehicle which comprises: (a) a rotor; (b) a stator disposed around the rotor, the stator including a stator core in which a plurality of slots are formed, the stator core having ends opposed to each other in an axial direction of the stator; and (c) a stator winding wound through the slots of the stator core. The stator winding is made up of a plurality of conductor segments. Each of the conductor segments includes an in-slot portion disposed in one of the slots and an end portion extending from the in-slot portion outside one of the ends of the stator core. The end portions are broken down into at least a first and a second group. Each of the end portions of the first group is connected to one of the end portions of the first group through a first joint. Each of the end portions of the second group is connected to one of the end portions of the second group through a second joint. Each of the first joints is elongated in the axial direction of the stator core to have a circumferential length which is 1.5 times or more greater than that of a transverse sectional area of the conductor segments.

According to the third aspect of the invention, there is provided an alternator for a vehicle which comprises: (a) a rotor; (b) a stator disposed around the rotor, the stator including a stator core in which a plurality of slots are formed, the stator core having ends opposed to each other in an axial direction of the stator; and (c) a stator winding wound through the slots of the stator core. The stator winding is made up of a plurality of conductor segments. Each of the conductor segments includes an in-slot portion disposed in one of the slots and an end portion extending from the in-slot portion outside one of the ends of the stator core. The end portions are broken down into at least a first and a second group. Each of the end portions of the first group is connected to one of the end portions of the first group through a first joint. Each of the end portions of the second group is connected to one of the end portions of the second group through a second joint. Each of the first joints is elongated in the axial direction of the stator core to have a length which is 1.5 times or more greater than that of a transverse sectional area of the conductor segments.

According to the third aspect of the invention, there is provided an alternator for a vehicle which comprises: (a) a rotor; (b) a stator disposed around the rotor, the stator including a stator core in which a plurality of slots are formed, the stator core having ends opposed to each other in an axial direction of the stator; and (c) a stator winding wound through the slots of the stator core. The stator winding being made up of a plurality of conductor segments. Each of the conductor segments includes an in-slot portion disposed in one of the slots and an end portion extending from the in-slot portion outside one of the ends of the stator core. The end portions are broken down into at least a first and a second group. Each of the end portions of the first group is connected to one of the end portions of the first group through a first joint. Each of the end portions of the second group is connected to one of the end portions of the second group through a second joint. Each of the first joints is located at a predetermined interval away from a tip end of at least one of the end portions connected by the each of the first joints.

According to the fourth aspect of the invention, there is provided an alternator for a vehicle which comprises: (a) a rotor; (b) a stator disposed around the rotor, the stator including a stator core in which a plurality of slots are formed, the stator core having ends opposed to each other in an axial direction of the stator; (c) a stator winding wound through the slots of the stator core, the stator winding being made up of a plurality of conductor segments, each of the conductor segments including an in-slot portion disposed in one of the slots and an end portion extending from the in-slot portion outside one of the ends of the stator core, the end portions being broken down into at least a first and a second group; and (d) discrete joining members each of which joins two of the first group of the end portions. Each of the joining members includes a protrusion working as a radiator fin to dissipate thermal energy from the conductor segments.

According to the fifth aspect of the invention, there is provided an alternator for a vehicle which comprises: (a) a rotor; (b) a stator disposed around the rotor, the stator including a stator core in which a plurality of slots are formed, the stator core having ends opposed to each other in an axial direction of the stator; and (c) a stator winding wound through the slots of the stator core. The stator winding is made up of a plurality of conductor segments. Each of the conductor segments includes an in-slot portion disposed in one of the slots and an end portion extending from the in-slot portion outside one of the ends of the stator core. Each of the end portions includes a slant portion and a tip portion. Each of the slant portions extends from a corresponding one of the in-slot portions and is oriented both in a circumferential direction and in an axial direction of the stator core. Each of the tip portions extends from a corresponding one of the slant portions in the axial direction of the stator core. Each of the tip portions has a length made up of a first, a second, and a third section. The first section of each of the tip portions faces substantially parallel to the first section of one of the tip portions and extends over a first distance 1 from the slant portion. The second section of each of the tip portions forms a joint to the second section of one of the tip portions and extends over a second distance 2. The third section of at least one of two of the tip portions connected through one of the joints extends over a third distance 3 from the second section. The first, second, and third distances 1, 2 and 3 meet a relation of 3>1+2.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
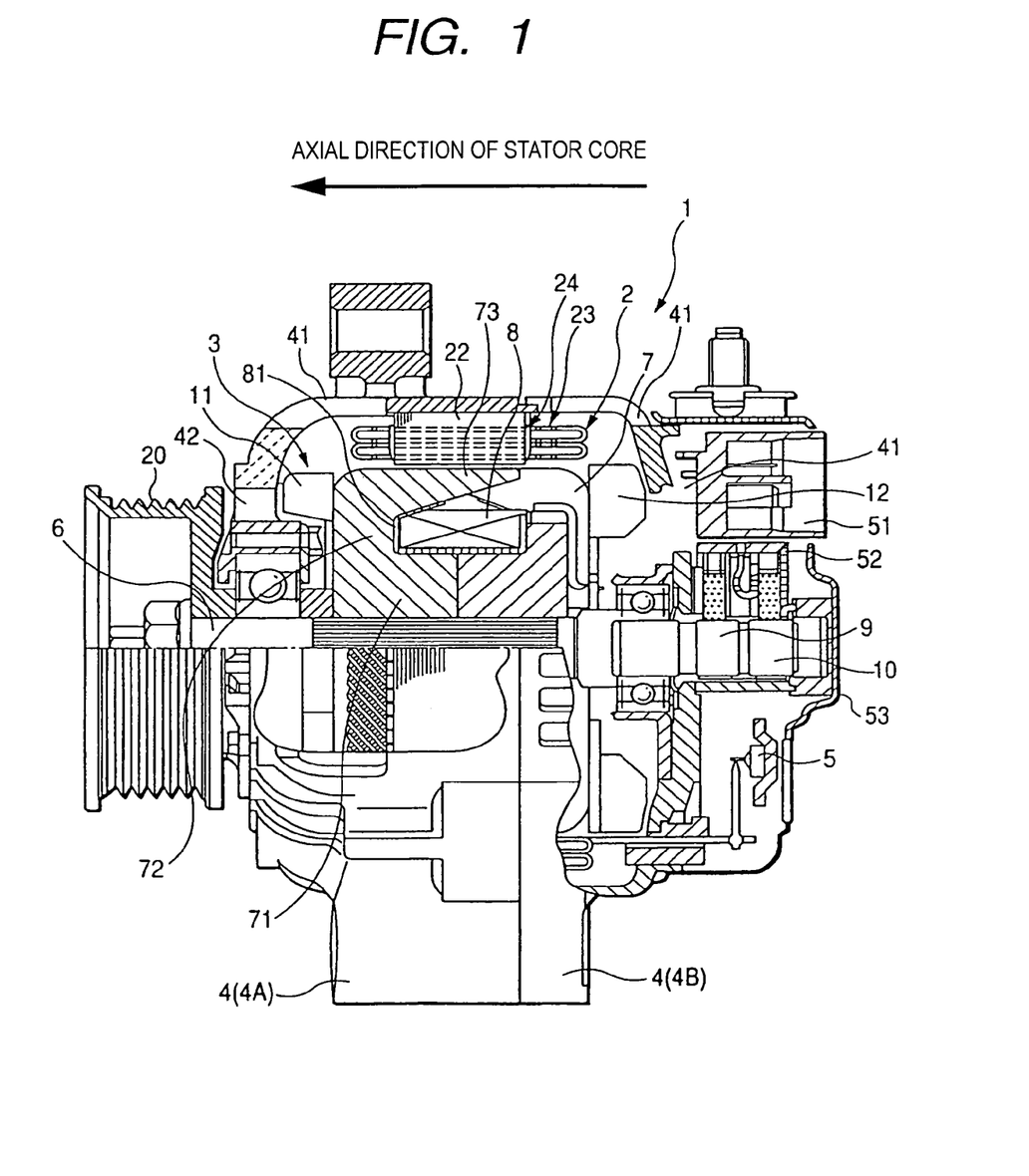
FIG. 1 is a partially longitudinal sectional view which shows the structure of an alternator according to the first embodiment of the invention.

Referring to the drawings, wherein like reference numbers refer to like parts in several views, particularly to FIG. 1, there is shown an AC generator or alternator 1 for automotive vehicles according to the first embodiment of the invention.

The alternator 1 consists essentially of a stator 2, a rotor 3, a frame 4, and a rectifier device 5.

The stator 2 includes a stator core 22, a stator winding 23, and insulators 24. The stator winding 23 is made of a plurality of sequentially-joined conductor segments disposed in 96 slots 25 formed in the stator core 22. The insulators 24 are disposed in the stator core 22 to insulate the stator core 22 electrically from the stator winding 23. The stator core 22 is made of a lamination of thin steel plates. The stator winding 23 is made up of two types of portions: one being disposed in the slots 25 of the stator core 22 (will be referred to as in-slot portions below), and the other extending in an axial direction of the stator core 22 outside ends of the stator core 22 (will also be referred to as coil end portions below).

Figure 4:
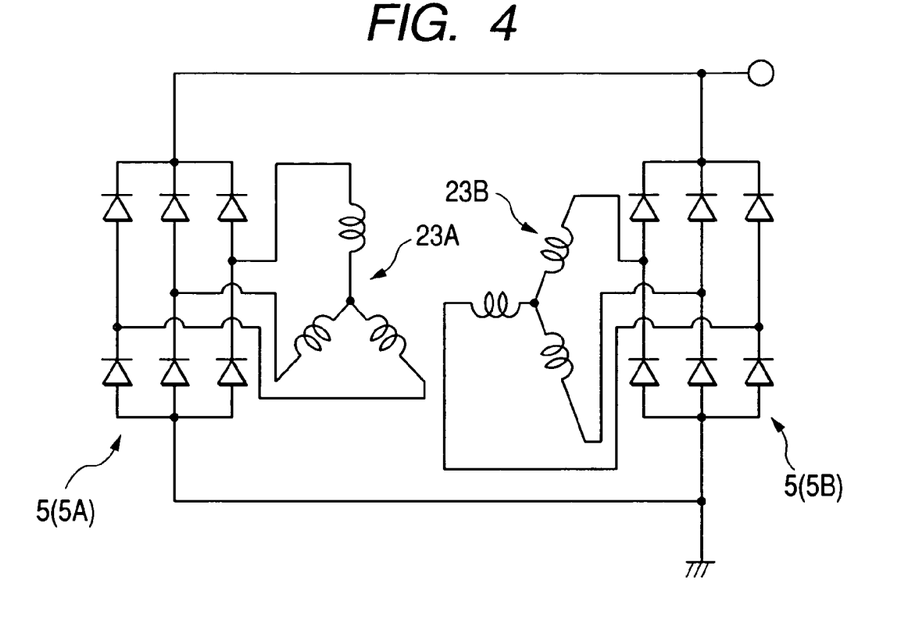
FIG. 4 is a diagram which shows a circuit structure of the alternator of FIG. 1.

The stator winding 23 is made up of a plurality of multi-phase winding sets. In this embodiment, the stator winding 23 is, as illustrated in FIG. 4, made up of two three-phase winding sets 23A and 23B which are located at an interval of a 30° electrical angle away from each other in the stator core 22. The three-phase winding set 23A is made of three Y-connected (also called star-connected) windings which will be referred to below as an X-phase winding, a Y-phase winding, and a Z-phase winding. Similarly, the three-phase winding set 23B is made of three Y-connected windings which will be referred to below as a U-phase winding, a V-phase winding, and a W-phase winding. The details of structure of the stator winding 23 will be described later.

The rotor 3 is, as clearly shown in FIG. 1, disposed inside the inner periphery of the stator core 22 to be rotatable together with a shaft 6. The rotor 3 is made up of a pair of Randel-type pole cores 7, a field coil 8, and slip rings 9 and 10. The shaft 6 is coupled with a pulley 20 driven by output torque of an engine (not shown) mounted in an automotive vehicle. A mixed flow fan 11 and a centrifugal fan 12 are secured on opposed ends of the rotor 3 to be rotatable following rotation of the rotor 3 to create flows of cooling air.

The Randel-type pole cores 7 are fitted together, as illustrated in FIG. 1, and each made up of a cylindrical boss 71 installed on the shaft 6, a disc 72 extending radially from one of opposed ends of the boss 71, and a plurality of claw poles 73 extending from the circumference of the disc 72 in an axial direction thereof at regular intervals. Each of the claw poles 73 of one of the pole cores 7 is disposed between adjacent two of the claw poles 73 of the other pole core 7. The field coil 8 is wound around the pole cores 7 through an insulating sheet 81 and placed in abutment with the claw poles 73 under a given compressive pressure. The insulating sheet 81 is made of a resin-impregnated sheet and embraces the field coil 8. The insulating sheet 81 is affixed firmly to the field coil 8 through heat treatment and works to insulate the field coil 8 electrically from the pole cores 7.

The mixed flow fan 11 is welded to an end surface of the disc 72 of one of the pole cores 7 closer to the pulley 20. The centrifugal fan 12 is welded to an end surface of the disc 72 of the other pole core 7. The mixed flow fan 11 is so designed as to have a projected area (i.e., area of a blade projected in a direction of rotation thereof) smaller than that of the centrifugal fan 12.

The frame 4 retains the stator core 22 at a given interval away from the outer periphery of the pole cores 7 of the rotor 3 and covers the coil end portions of the stator winding 23 through an air gap. The frame 4 is made up of a front frame 4A and a rear frame 4B which are joined together through bolts (not shown). The frame 4 has cooling air inlet windows 41 formed in an end wall thereof through which air enters and hits the coil end portions of the stator winding 23 and cooling air outlet windows 42 formed in the other end wall thereof through which the air goes out of the alternator 1.

The alternator 1 also has the rectifier device 5 and a brash unit 52 installed outside the rear frame 4B and a rear cover 53 covering them.

The rectifier device 5 is connected to leads extending from the stator winding 23 and works to provide full-wave rectification to transfer three-phase ac voltage inputted thereto into dc voltage. Specifically, the rectifier device 5, as illustrated in FIG. 4, includes two three-phase full-wave rectifiers 5A and 5B, one for each of the three-phase winding sets 23A and 23B.

In operation of the alternator 1, when the torque is transmitted from the engine to the pulley 20 through a belt, the stator 3 rotates in a given direction. Application of excitation voltage to the field coil 8 of the stator 3 will cause the claw poles of the pole cores 7 to be excited to develop three-phase ac voltage. The rectifier device 5 outputs dc power from output terminals thereof.

The structure of the stator 2 will be described below in detail.

Figure 2:
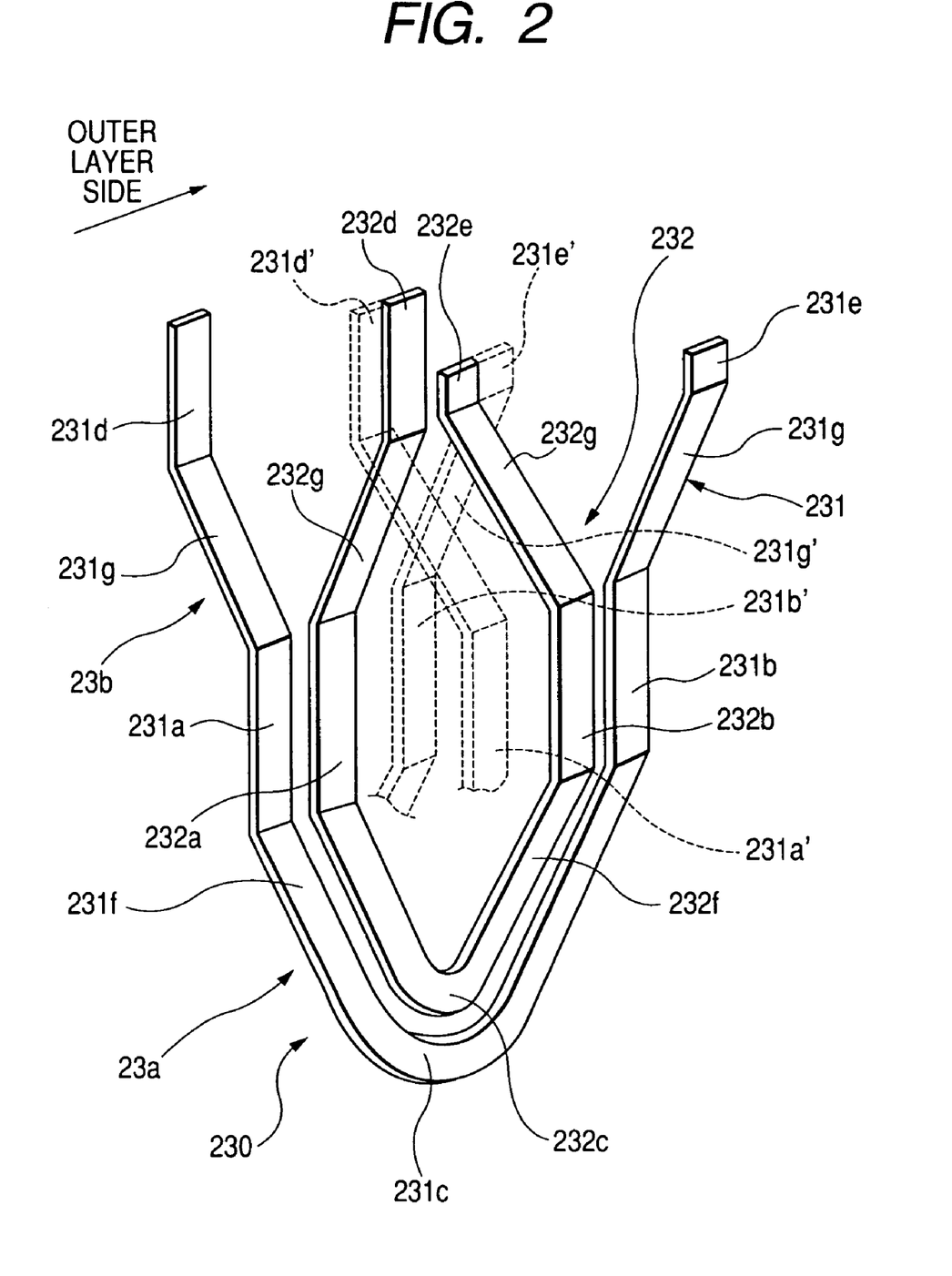
FIG. 2 is a perspective view which shows a pair of conductor segments making up a stator winding of the alternator of FIG. 1.

The stator 2, as described above, includes the stator winding 23. The stator winding 23 is made up of a plurality of U-shaped conductor segments 230, as illustrated in FIG. 2, each having a rectangular cross section. An even number (four in this embodiment) of the conductor segments 230 are disposed in each of the slots 25 of the stator core 22. Each of the conductor segments 230 has a rectangular cross section elongated in the radius direction of the stator core 22. The conductor segments 230 are so arrayed as to have long sides extending in the radius direction of the stator core 22. Four of the conductor segments 230 are, as illustrated in FIG. 3, inserted into each of the slots 25 to form four layers arrayed in the radius direction of the stator core 22.

Figure 3:
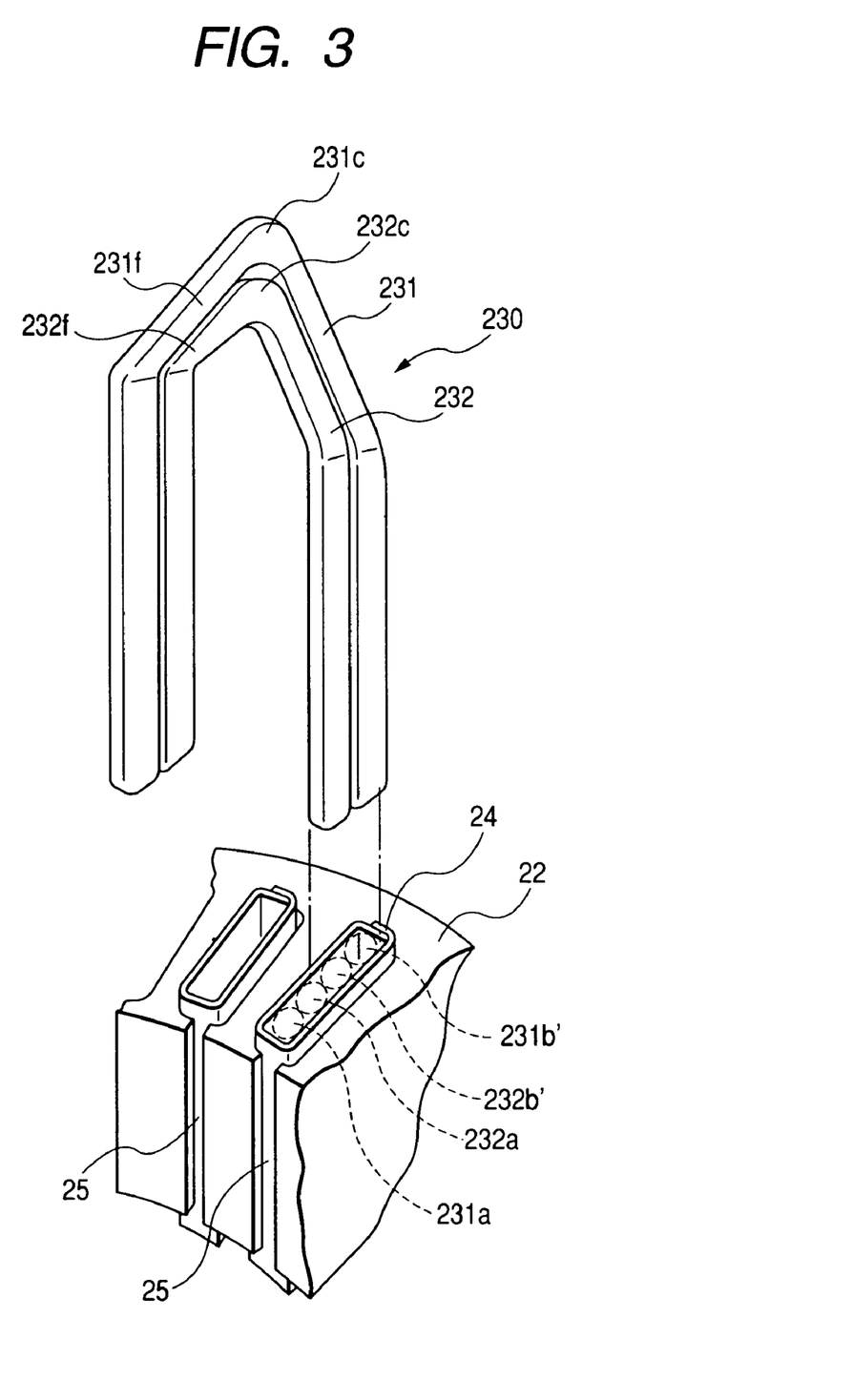
FIG. 3 is a partially perspective view which shows conductor segments and a stator core in which the conductor segments are disposed.

As illustrated in at least FIGS. 2 and 3, there are two types of conductor segments: large-sized conductor segments 231 and small-sized conductor segments 232. Each of the large-sized conductor segments 231 surrounds or extends over one of the small-sized conductor segments 232.

Each of the large-sized conductor segments 231 consists of a V-shaped head 23a (will also be referred to below as a V-shaped coil end), a pair of legs extending straight from the head into the slot 25 (will also be referred to below in-slot portions 231a and 231b), and a pair of ends 23b extending the legs outside the slot 25 (will also be referred to below as joint ends below). The V-shaped head 23a of each of the large-sized conductor segments 231 is made up of a turn 231c and a pair of slant end portions 231f. The end 23b of each of the large-sized conductor segments 231 is made up of a straight end portion 231d or 231e and a slant end portion 231g. Each of the large-sized conductor segments 231 has the in-slot portions 231a and 231b disposed within two of the slots 25 located at one pole pitch from each other.

In FIGS. 2 and 3, each reference number with a prime (') denotes the same portion as that of the another conductor segment 231 or 232 referred to by a like reference number with no prime.

Specifically, the in-slot portion 231a of each of the large-sized conductor segments 231 is inserted into an innermost portion of one of the slots 25, while the in-slot portion 231b thereof is inserted into an outermost portion of another of the slots 25 spaced at one pole pitch in the clockwise direction, as viewed in FIG. 3.

Similarly, each of the small-sized conductor segments 232 consists of a V-shaped head (will also be referred to below as a V-shaped coil end), a pair of legs extending straight from the head into the slot 25 (will also be referred to below in-slot portions 232a and 232b), and a pair of ends extending the legs outside the slot 25 (will also be referred to below as joint ends below). The V-shaped head of each of the small-sized conductor segments 232 is made up of a turn 232c and a pair of slant end portions 232f. The end of each of the small-sized conductor segments 232 is made up of a straight end portion 232d or 232e and a slant end portion 232g. Each of the small-sized conductor segments 232 has the in-slot portions 232a and 232b disposed within two of the slots 25 located at one pole pitch from each other.

Specifically, the in-slot portion 232a of each of the small-sized conductor segments 231 is inserted into an inner intermediate portion of one of the slots 25, while the in-slot portion 232b thereof is inserted into an outer intermediate portion of another of the slots 25 spaced at one pole pitch in the clockwise direction, as viewed in FIG. 3.

Figure 5:
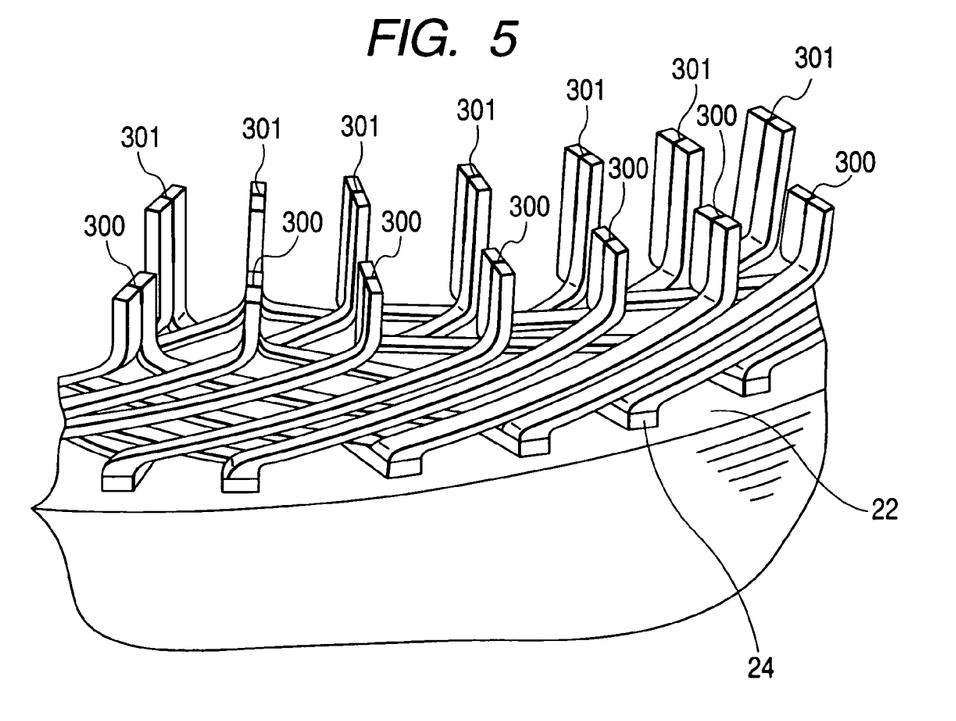
FIG. 5 is a partially perspective view whish shows arrays of joined ends of conductor segments wound in a stator core of the alternator of FIG. 1.
Figure 6:
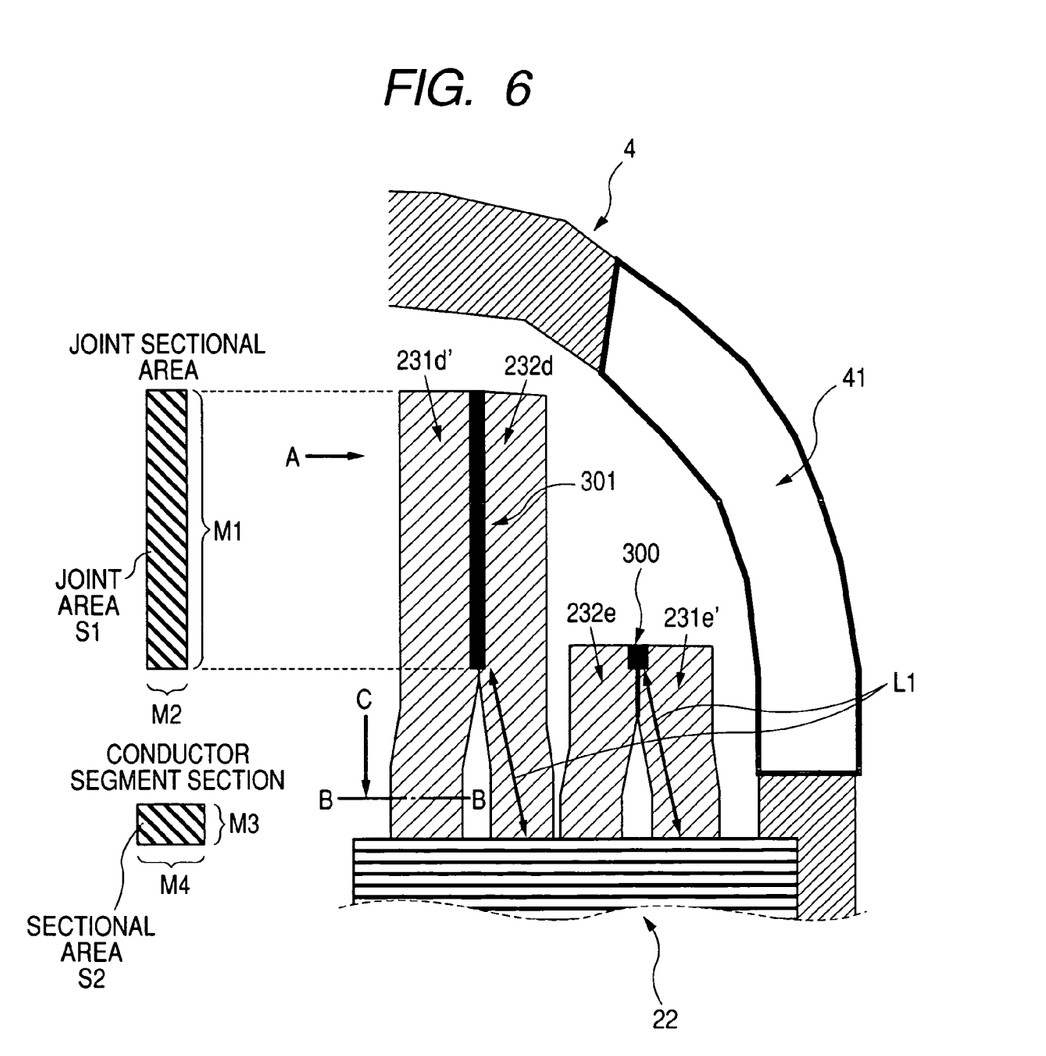
FIG. 6 is a partially sectional view which shows joined ends of conductor segments of the alternator of FIG. 1.

As illustrated in at least FIGS. 2, 5 and 6, the end portions are broken down into at least a first group (e.g., FIG. 2, 231d, 231d', 232d; FIG. 5, inside array; FIG. 6, 231d', 232d) and a second group (e.g., FIG. 2, 231e, 231e', 232e; FIG. 5, outside array; FIG. 6, 232e, 231e'). Each of the end portions of the first group is connected to one of the other end portions of the first group through a first joint (e.g., FIG. 6, joint 301). Each of the end portions of the second group is connected to one of the end portions of the second group through a second joint (e.g., FIG. 6, joint 300). As can be seen from FIG. 2, the in-slot portion 232a of each of the small-sized conductor segments 232 disposed in the inner intermediate portion of one of the slots 25 is coupled with the in-slot portion 231a' of one of the large-diameter conductor segments 231 disposed in the innermost portion of the another slot 25 spaced at an interval of one pole pitch in the clockwise direction, as viewed in FIG. 3. Similarly, the in-slot portion 231b' of each of the large-sized conductor segments 231 disposed in the outermost portion of one of the slots 25 is coupled with the in-slot portion 232b' of one of the small-diameter conductor segments 232 disposed in the outer intermediate portion of the another slot 25 spaced at an interval of one pole pitch in the clockwise direction, as viewed in FIG. 3. Such couplings are achieved by joining the ends of the large-sized and small-sized conductor segments 231 and 232 extending outside one of the ends of the stator core 22 through ultrasonic welding, TIG welding, or brazing. The conductor segments 230 may each be coated with an insulating film. In this case, the insulating film is stripped from the ends of each of the conductor segments 230 to ensure an electrical joint between two of the conductor segments 230.

The large-sized conductor segments 231, as described above, each include the slant end portions 231f and 231g and the straight end portions 231d and 231e. The slant end portions 231f and 231g are inclined at a given angle to the axis of the stator core 22 both in the axial direction and in the circumferential direction of the stator core 22. The straight end portions 231d and 231e extend substantially parallel to the axis of the stator core 22. Similarly, the small-sized conductor segments 232 each include the slant end portions 232f and 232g and the straight end portions 232d and 232e. The slant end portions 232f and 232g are inclined at a given angle to the axis of the stator core 22 both in the axial direction and in the circumferential direction of the stator core 22. The straight end portions 232d and 232e extend substantially parallel to the axis of the stator core 22.

The straight end portions 231d' and 232d extending from the innermost portion and the inner intermediate portion of each of the slots 25 are, as clearly illustrated in FIG. 2, longer than the straight end portions 232e and 231e' extending from the outer intermediate portion and the outermost portion of each of the slots 25 in the axial direction of the stator core 22. This causes the tips of the straight end portions 231d' and 232d to extend further away from the stator core than those of the straight end portions 232e and 231e' in the axial direction of the stator core 22.

The straight end portion 232e extending from the outer intermediate portion of the slot 25 (will also be referred to below as the outer intermediate straight end portion 232e) is, as illustrated in FIG. 6, welded to the straight end portion 231e' extending from the outermost portion of the slot 25 (will also be referred to below as the outermost straight end portion 232e) through a joint 300 formed between tips of side walls thereof.

The straight end portion 231d' extending from the innermost portion of the slot 25 (will also be referred to below as the innermost straight end portion 231d') is, as illustrated in FIG. 6, welded to the straight end portion 232d extending from the inner intermediate portion of the slot 25 (will also be referred to below as the inner intermediate straight end portion 232d) through a joint 301 formed between substantially entire side walls thereof. If a longitudinal sectional area of the joint 301 between the straight end portions 213d' and 232d extending parallel to the axial direction of the stator core 22 (i.e., a longitudinal direction of the joint 301) is defined as S1 (i.e., a sectional area of the joint 301, as viewed from an arrow A), and a transverse sectional area of the conductor segment 230, as taken along the line B-B extending perpendicular to the length (or longitudinal center line) of the conductor segment 230 (i.e., a sectional area of the conductor segment 230, as viewed from an arrow C, not including that of a coating) is defined as S2, the area S1 is set 1.5 times or more greater than the area S2. The circumferential length of the area S1 of the joint 301 (i.e., 2×M1+2×M2) is 1.5 times or more greater than that of the area S2 of the conductor segment 230 (i.e., 2×M3+2×M4). In this embodiment, the width M3 of the conductor segment 230 is equal to the width M2 of the sectional area S1. The length M1 of the area S1 of the joint 301 is 1.5 times or more greater than the length M4 of the area S2 of the conductor segment 230. Specifically, the joint 301 extends greatly in the lengthwise direction of the conductor segment 230.

The distance between an end of the joint 300 closest to the stator core 22 and one of the axially opposed ends of the stator core 22 is equal to that between an end of the joint 301 closest to the stator core 22 and the one of the ends of the stator core 22. This is expressed by L1 in FIG. 6.

Each of the joints 300 is, as can be seen from FIG. 5, shifted from one of the joints 301 in the radius direction of the stator core 22. Specifically, the joints 301 are arrayed along a circle defined coaxially with the stator core 22. Similarly, the joints 300 are arrayed along a circle which is defined coaxially with the stator core 22 outside the array of the joints 301.

A flow of air produced by the mixed flow fan 11 and the centrifugal fan 12 installed on the opposed ends of the rotor 3 passes through the slant end portions 231g and 232g and the straight end portions 231d, 231e, 232d, and 232e of the conductor segments 230 to cool the stator winding 23.

The alternator 1 of this embodiment is designed to have, as illustrated in FIG. 6, the straight end portions 231d' and 232d which are longer than and extend a further distance from the stator core than the straight end portions 231e' and 232e in the axial direction of the stator core 22. The straight end portions 231d' and 232d, thus, serve as radiator fins with a large surface area to dissipate a large amount of heat from the stator winding 23. The joints 301 extend at the end of the conductor segments 230 in the axial direction of the stator core 22, so that the induced current, as produced in the conductor segments 230, flows through the joints 301 without reaching the tips of the conductor segments 230, thus resulting in no increase in electrical resistance of the conductor segments 230 to the flow of the induced current. The sectional area S1 of the joints 301 is, as described above, 1.5 times or more greater than the sectional area S2 of the conductor segments 230, thereby enhancing the strength of connection between the conductor segments 230 and minimizing the electrical resistance in the joints 301 to keep the amount of heat generated in the joints 301 small. The annular array of the longer joints 301 is located inside the annular array of the shorter joints 300, thus ensuring desired volumes of paths through which air entering at the air inlet windows 41 flows to cool the stator winding 23 effectively and also decreasing generation of electric erosion between the frame 4 that is at a ground potential and the ends of the conductor segments 230 that are at higher potentials.

The ends of the conductor segments 230 connected through the joints 301 are longer than those of the conductor segments 230 connected through the joints 300, but however, the distance L1 between the lower end of the joint 301 and the stator core 22 is equal to the distance L1 between the lower end of the joint 303 and the stator core 22, so that an induced current flow path extending through the joints 301 in the conductor segments 230 that is a function of the electrical resistance is substantially identical with that extending through the joints 300 in the conductor segments 230, thus avoiding an increase in amount of heat energy generated by the conductor segments 230 connected through the joints 301.

In order to ensure the electrical insulation around the joints 300 and 301, the straight end portions 231d, 232d, 232e, and 231e may be covered with a resin coating having higher heat dissipation ability.

Figure 7:
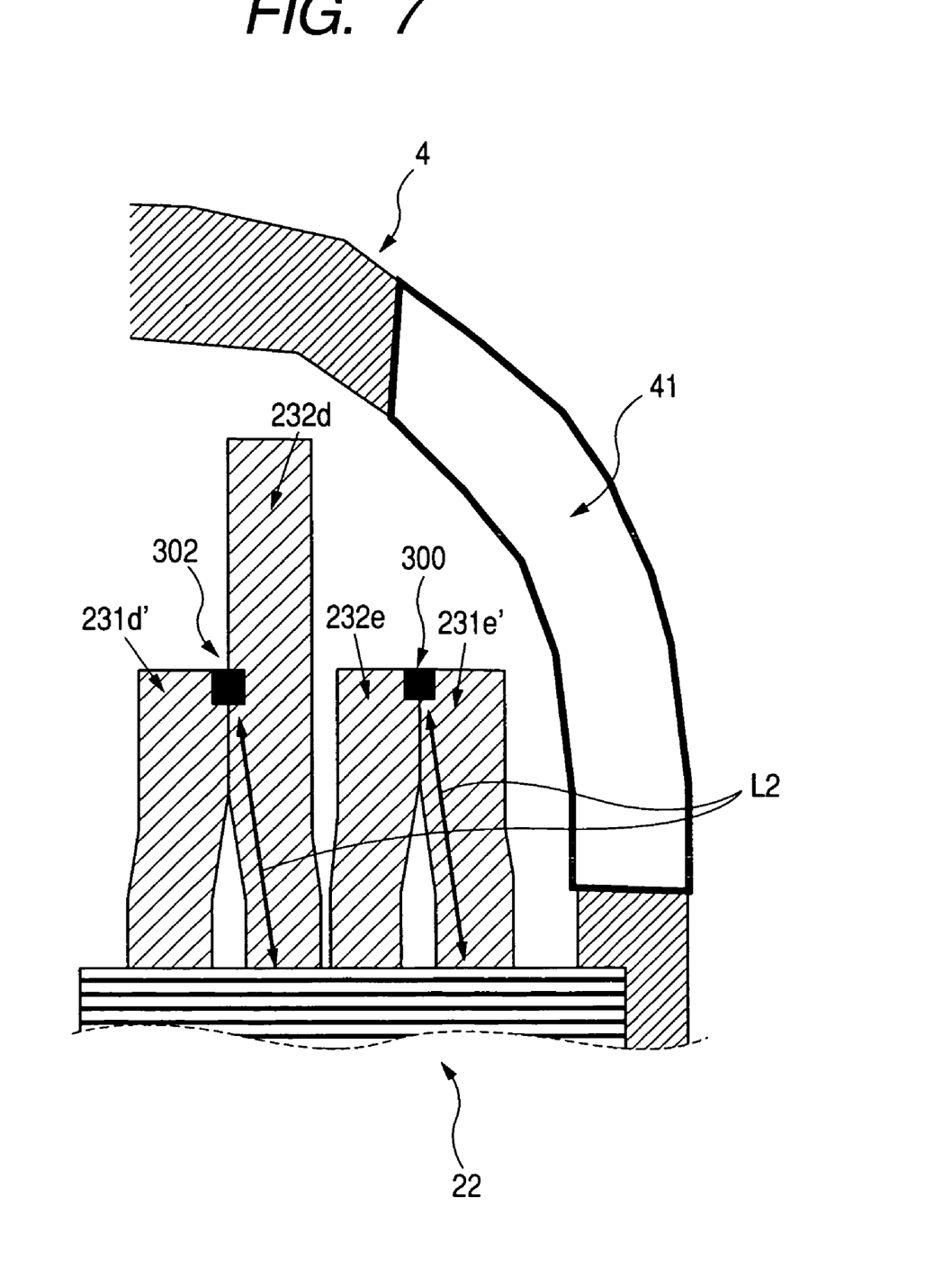
FIG. 7 is a partially sectional view which shows joined ends of conductor segments of an alternator according to the second embodiment of the invention.

FIG. 7 shows highlights of an alternator according to the second embodiment of the invention which is different from the alternator 1 of the first embodiment only in that the inner intermediate straight end portion 232d of each of the small-sized conductor segments 232 is longer than the other straight end portions 232e, 231e', and 232d'. Other arrangements are identical, and explanation thereof in detail will be omitted here.

The tip of one of the side walls of the straight end portion 231d' is TIG-welded to a portion of one of the side walls of the inner intermediate straight end portion 232d through a joint 302.

A portion of the conductor segment 230 between the tip of the straight end portion 232d and the joint 302 serves as a radiator fin. The induced current, as produced in the conductor segments 230, flows through the joint 302 without passing through the radiator fin, thus resulting in no increase in electrical resistance of the conductor segments 230 to the flow of the induced current.

The annular array of the joints 302 is, like the first embodiment, located inside the annular array of the joints 300, thus ensuring desired volumes of paths through which air entering at the air inlet windows 41 flows to cool the stator winding 23 effectively and also decreasing generation of electric erosion between the frame 4 that is at a ground potential and the ends of the conductor segments 230 that are at higher potentials.

The distance between an end of the joint 302 closest to the end of the stator core 22 and the end of the stator core 22 is equal to that between the end of the joint 300 closest to the stator core 22 and the end of the stator core 22. This is expressed by L2 in FIG. 7. In other words, the induced current flow path extending through the joints 302 in the conductor segments 230 that is a function of the electrical resistance is substantially identical with that extending through the joints 300 in the conductor segments 230, thus avoiding an increase in amount of heat energy generated by the conductor segments 230 connected through the joints 302.

The tip of the straight end portion 231d' of the conductor segment 230 is joined to the straight end portion 232d by, for example, the TIG welding, thus facilitating ease of the welding operation.

Figure 8:
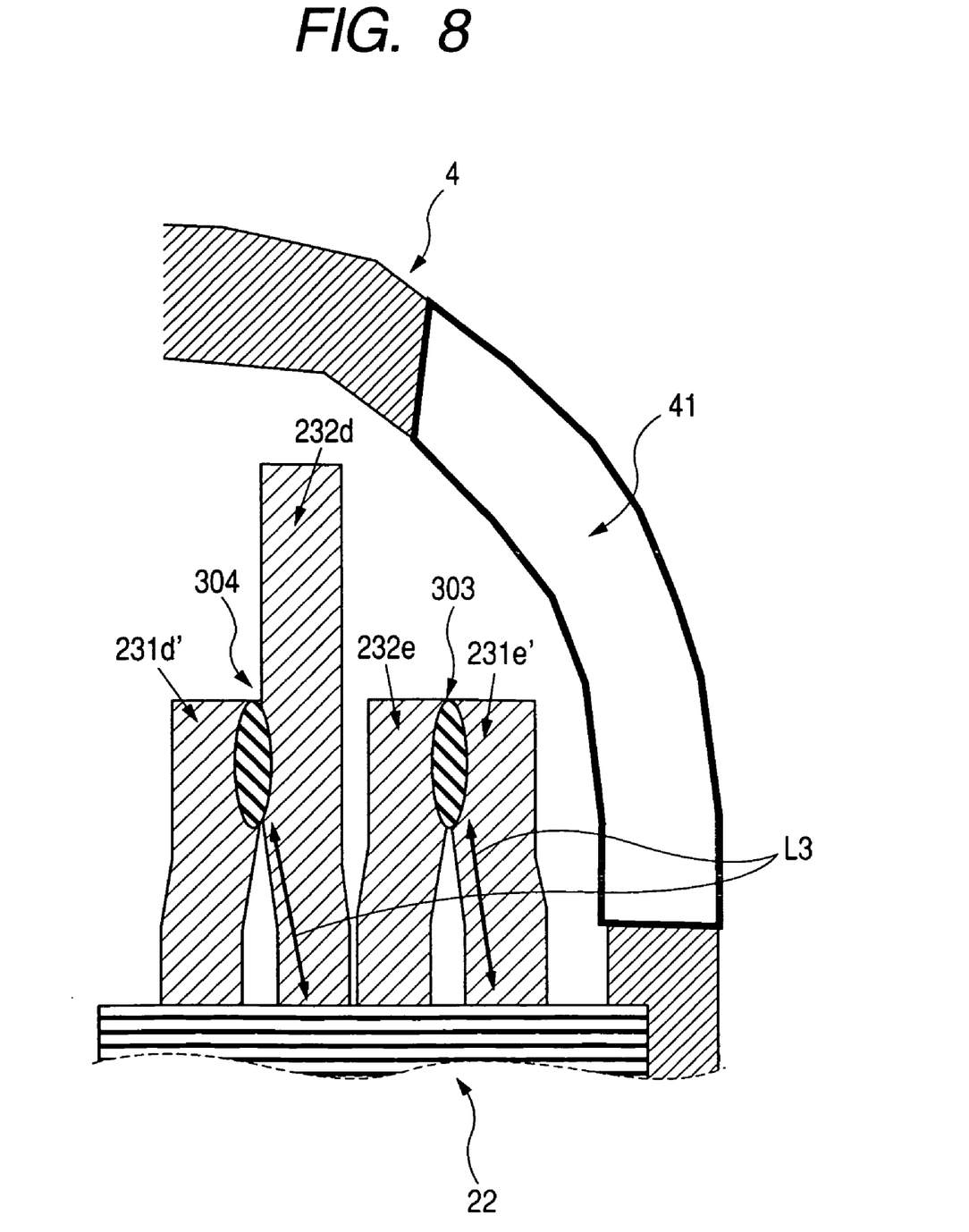
FIG. 8 is a partially sectional view which shows joined ends of conductor segments of a modification of the alternator of FIG. 7.

FIG. 8 shows a modification of the alternator in FIG. 7.

The straight end portions 231d', 232d, 232e, and 232e' are brazed instead of the TIG welding.

The joint 304 between the straight end portions 231d' and 232d and the joint 303 between the straight end portions 232e and 231e' are greater in sectional area than the joints 302 and 300 in FIG. 7, thus resulting in a decreased electrical resistance to the flow of induced current through the conductor segments 230.

The distance between an end of the joint 304 closest to the end of the stator core 22 and the end of the stator core 22 is, like the above embodiments, equal to that between the end of the joint 303 closest to the stator core 22 and the end of the stator core 22. This is expressed by L3 in FIG. 8.

Figure 9:
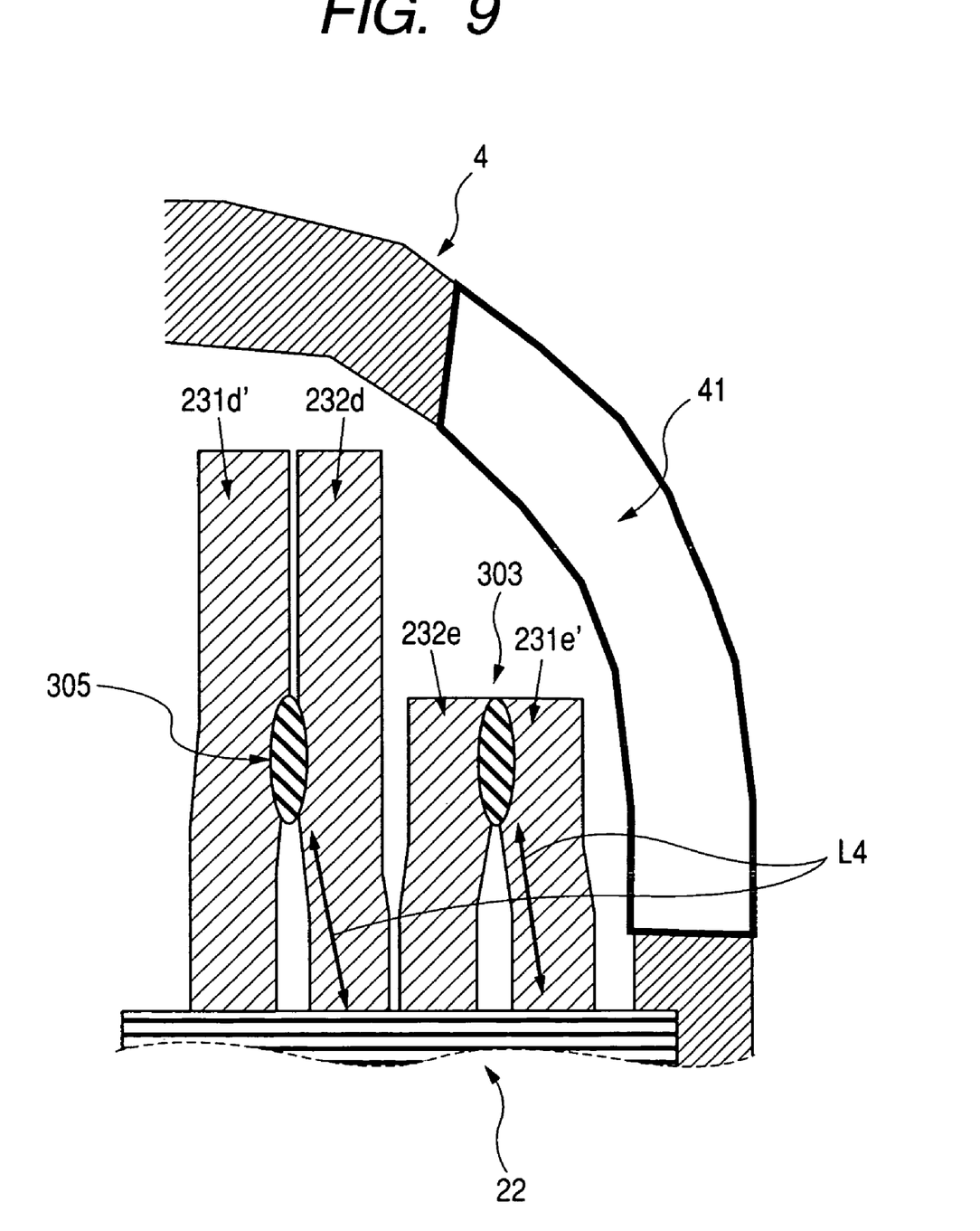
FIG. 9 is a partially sectional view which shows joined ends of conductor segments of an alternator according to the third embodiment of the invention.

FIG. 9 shows highlights of an alternator according to the third embodiment of the invention.

The innermost straight end portion 231d' of each of the large-sized conductor segments 231 and the inner intermediate straight end portion 232d of each of the small-sized conductor segments 232 are longer than the other straight end portions 232e and 231e'. Other arrangements are identical, and explanation thereof in detail will be omitted here.

Portions of the side walls of the straight end portions 231d' and 232d which are at a preselected distance from the tips thereof are welded together to form a joint 305.

Portions of the conductor segments 230 between the tips of the straight end portions 231d' and 232d and the joint 305 function as a radiator fin. The induced current, as produced in the conductor segments 230, flows through the joint 305 without passing through the radiator fin, thus resulting in no increase in electrical resistance of the conductor segments 230 to the flow of the induced current.

The annular array of the joints 305 is, like the first embodiment, located inside the annular array of the joints 303, thus ensuring desired volumes of paths through which air entering at the air inlet windows 41 flows to cool the stator winding 23 effectively and also decreasing generation of electric erosion between the frame 4 that is at a ground potential and the ends of the conductor segments 230 that are at higher potentials.

This structure has a difficult in joining the straight end portions 231d' and 232d through the TIG welding to ensure a desired configuration of the radiator fin and hence the joint 305 is established by brazing.

The distance between an end of the joint 305 closest to the end of the stator core 22 and the end of the stator core 22 is equal to that between the end of the joint 303 closest to the stator core 22 and the end of the stator core 22. This is expressed by L4 in FIG. 7. In other words, the induced current flow path extending through the joints 305 in the conductor segments 230 that is a function of the electrical resistance is substantially identical with that extending through the joints 303 in the conductor segments 230, thus avoiding an increase in amount of heat energy generated by the conductor segments 230 connected through the joints 305.

Figure 10A:
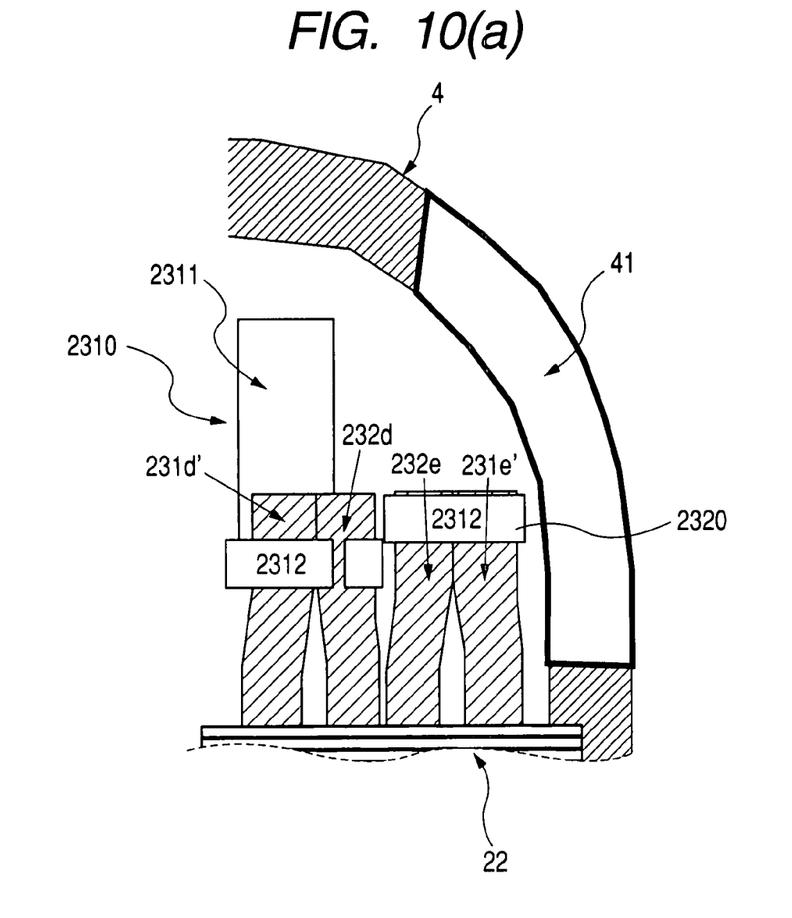
FIG. 10(a) is a partially sectional view which shows joined ends of conductor segments of an alternator according to the fourth embodiment of the invention.
Figure 10B:
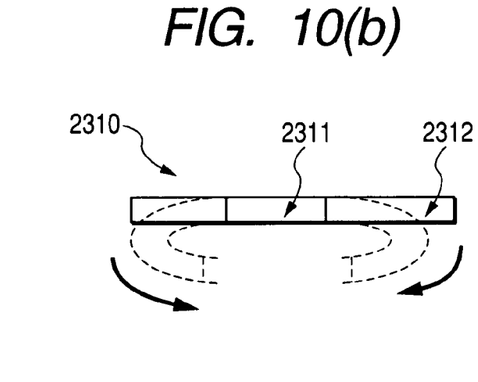
FIG. 10(b) is a top view which shows a joining member to join ends of conductor segments, as illustrated in FIG. 10(a)
Figure 10C:
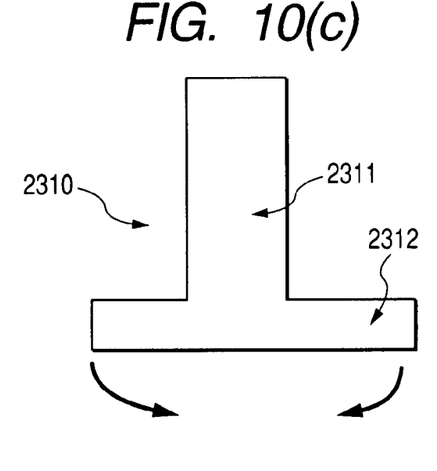
FIG. 10(c) is a plane view which shows the joining member of FIG. 10(b)

FIGS. 10(a), 10(b), and 10(c) show highlights of an alternator according to the fourth embodiment of the invention which is different from those in the above embodiment in that the ends of the conductor segments 230 are joined using a separate joining member 2310.

The joining member 2310 is, as illustrated in FIG. 10(c), of a T-shape and formed by Fe-metallic plate plated with Cu which is high in thermal conductivity or alternatively Ni which is easy to weld. The joining member 2310 is made up of a rectangular strip 2311 functioning as a radiator fin and an elastically deformable strip 2312 extending perpendicular to the length of the rectangular strip 2311. The thickness and profile of the joining member 2310 are so predetermined as to establish required heat dissipating ability.

Joining of the straight end portions 231d' and 232d is achieved by wrapping the elastically deformable strip 2312 about the straight end portions 231d' and 232d and crimp it tightly, as illustrated in FIGS. 10(a) and 10(b). The elastically deformable strip 2312 may also be welded to the straight end portions 231d' and 232d by the resistance welding in order to strengthen the joining of the straight end portions 231d' and 232d further.

Use of the separate joining member 2310 enables the cooling capacity to cool the stator winding 23 be predesigned. The rectangular strip 2311 is physically insensitive to the welding of the straight end portions 231d' and 232d and extends straight in the axial direction of the stator core 22 without being deformed, so that it is exposed directly to a flow of air coming in at the air inlet windows 41 and has a required heat dissipation ability to cool the stator winding 23.

Joining of the straight end portions 232e and 231e' of an outer one of two circumferentially extending annular arrays of the conductor segments 230 is accomplished with use of a joining member 2320 not having the rectangular strip 2311. Specifically, the joining of the straight end portions 232e and 231e' is achieved by wrapping the elastically deformable strip 2312 of the joining member 2320 about the straight end portions 232e and 231e' and crimp it tightly or alternatively bending the rectangular strip 2311 of the joining member 2320 in the circumferential direction of the stator core 22 without physically interfering with the frame 4.

The two annular arrays of the ends of the conductor segments 230 extend coaxially around the end of the stator core 22, so that the vertically extending rectangular strips 2311 are located inside an outer one of the arrays, thus ensuring desired volumes of paths through which air entering at the air inlet windows 41 flows to cool the stator winding 23 effectively and also decreasing generation of electric erosion between the frame 4 that is at a ground potential and the rectangular strips 2311 that are at higher potentials.

In order to ensure electrical insulation between the joining members 2311 and the conductor segments 230, a portion of each of the conductor segments 230 which is wrapped by the joining member 2311 may be coated with an insulating resin material of the type having higher heat dissipating properties.

The rectangular strips 2311 extend straight in parallel to the axis of the stator core 22, but may be oriented in another direction such as a circumferential or a radius direction of the stator core 22.

Figure 11:
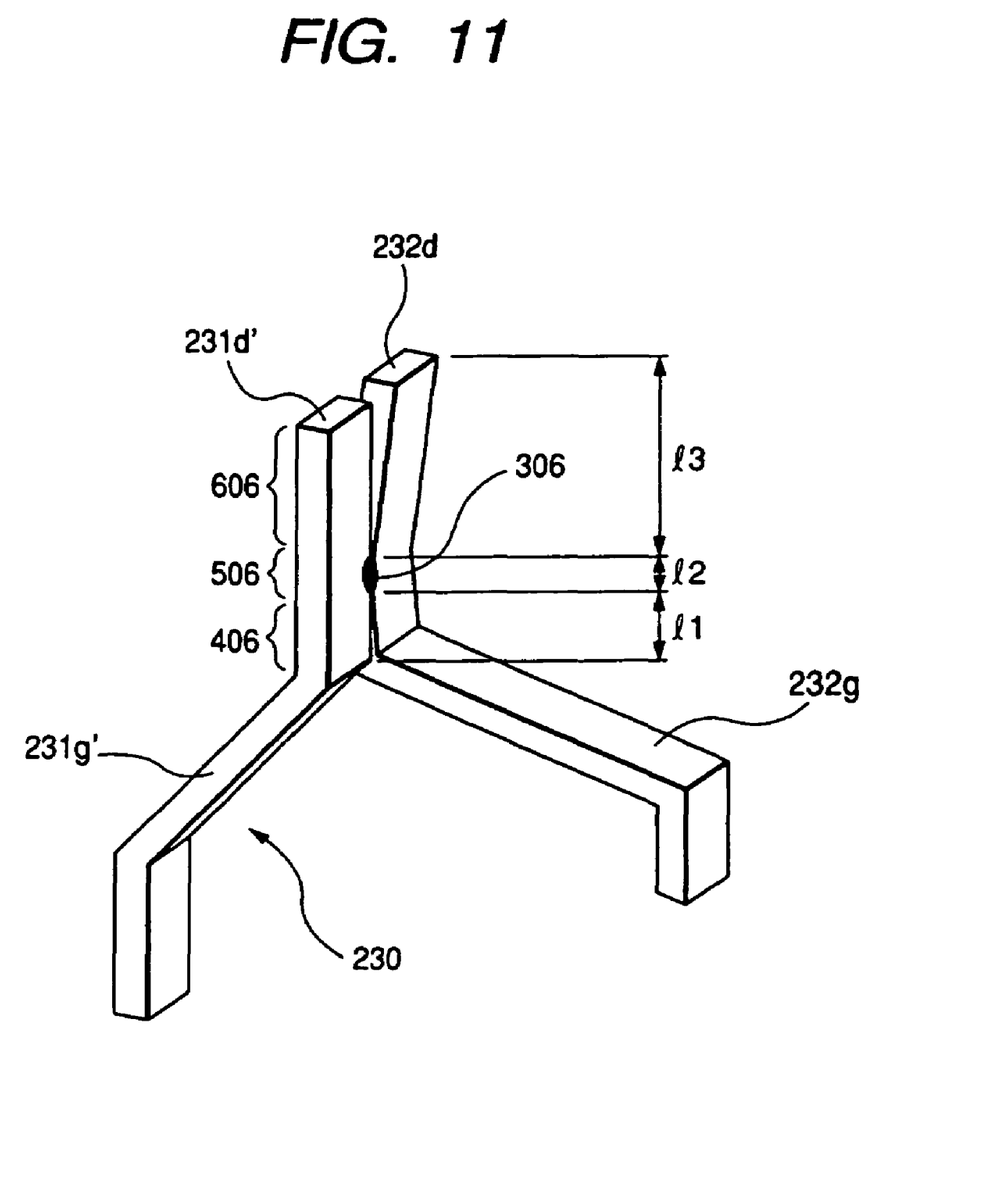
FIG. 11 is a perspective view which shows joined conductor segments of an alternator according to the fifth embodiment of the invention.

FIG. 11 shows a joined pair of the conductor segments 230 of an alternator according to the fifth embodiment of the invention which is a modification of the structure of the third embodiment, as illustrated in FIG. 9.

The innermost straight end portion 231d' of each of the large-sized conductor segments 231 and the inner intermediate straight end portion 232d of each of the small-sized conductor segments 232 are connected through a joint 306.

The straight end portion 231d' extends, like the above embodiments, substantially in the axial direction of the stator core 22 to have a length made up of an extension 606, a joining section 506, and a base section 406. The straight end portion 232d has the same structure as that of the straight end portion 232d', and explanation thereof in detail will be omitted here.

The base section 406 of the straight end portion 232d' has a side wall facing substantially parallel to that of the straight end portion 232d and extends over a distance l1 from an upper end, as viewed in FIG. 11, of the slant end portion 231g'. The joining section 506 of the straight end portion 232d' is welded to that of the straight end portion 232d through the joint 306 and extend over a distance l2 from the base section 406. In other words, the joint 306 has a longitudinal length of the distance l2. The extension 606 extends over a third distance l3 from the joining section 506. Only either of the straight end portions 231d' and 232d may alternatively have the extension 606. The first, second, and third distance l1, l2 and l3 meeting a relation of l3>l1+l2.

Other arrangements of the alternator are identical with those of the first embodiment, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the conductor segments 230 may be arranged in the stator core 22 in three or more arrays of joined ends thereof. The conductor segments 230 of an outer one of the annular arrays extending circumferentially of the stator core 22 may also have substantially the same physical structure as that of the inner one and be joined in the same manner as long as the geometry of the frame 4 permits it, that is, the outer array of the conductor segments 230 does not physically interfere with the inner wall of the frame 4.

What is claimed is:

1. An alternator for a vehicle comprising:
   a rotor;
   a stator disposed around said rotor, said stator including a stator core in which a plurality of slots are formed, the stator core having ends opposed to each other in an axial direction of said stator; and
   a stator winding wound through the slots of the stator core, said stator winding being made up of a plurality of conductor segments, each of the conductor segments including an in-slot portion disposed in one of the slots and an end portion extending from the in-slot portion outside one of the ends of the stator core, the end portions being broken down into at least a first and a second group, each of the end portions of the first group being connected to one of other end portions of the first group through a first joint, each of the end portions of the second group being connected to one of other end portions of the second group through a second joint, each of the first joints being elongated in the axial direction of the stator core to have a longitudinal sectional area which is 1.5 times or more greater than a transverse sectional area of the conductor segments.

2. An alternator as set forth in claim 1, wherein the first group of the end portions connected through the first joints extends further from the stator core than the second group of the end portions connected through the second joints, in the axial direction of the stator core, and wherein a distance between one of opposed ends of each of the first joints closer to an end of the stator core and the end of the stator core is substantially equal to that between one of the opposed ends of each of the second joints closer to the end of the stator core and the end of the stator core.

3. An alternator as set forth in claim 2, further comprising a frame which embraces said stator and to which the stator core of said stator is so secured as to locate the end portions of the conductor segments at a given interval away from a wall of said frame, and wherein joined pairs of the end portions are disposed on the end of the stator core in a plurality of annular arrays so that the first joints lie on one of the annular arrays other than an outermost one.

4. An alternator as set forth in claim 1, further comprising a cooling fan mounted on one of ends of said stator which are opposed to each other in an axial direction of said stator, said cooling fan working to feed cooling air to the end portions of the conductor segments.

5. An alternator for a vehicle comprising:
   a rotor;
   a stator disposed around said rotor, said stator including a stator core in which a plurality of slots are formed, the stator core having ends opposed to each other in an axial direction of said stator; and
   a stator winding wound through the slots of the stator core, said stator winding being made up of a plurality of conductor segments, each of the conductor segments including an in-slot portion disposed in one of the slots and an end portion extending from the in-slot portion outside one of the ends of the stator core, the end portions being broken down into at least a first and a second group, each of the end portions of the first group being connected to one of other end portions of the first group through a first joint, each of the end portions of the second group being connected to one of other end portions of the second group through a second joint, each of the first joints being elongated in the axial direction of the stator core to have a circumferential length which is 1.5 times or more greater than that of a transverse sectional area of the conductor segments.

6. An alternator as set forth in claim 5, wherein the first group of the end portions connected through the first joints extends further from the stator core than the second group of the end portions connected through the second joints, in the axial direction of the stator core, and wherein a distance between one of opposed ends of each of the first joints closer to an end of the stator core and the end of the stator core is substantially equal to that between one of the opposed ends of each of the second joints closer to the end of the stator core and the end of the stator core.

7. An alternator as set forth in claim 6, further comprising a frame which embraces said stator and to which the stator core of said stator is so secured as to locate the end portions of the conductor segments at a given interval away from a wall of said frame, and wherein joined pairs of the end portions are disposed on the end of the stator core in a plurality of annular arrays so that the first joints lie on one of the annular arrays other than an outermost one.

8. An alternator as set forth in claim 5, further comprising a cooling fan mounted on one of ends of said stator which are opposed to each other in an axial direction of said stator, said cooling fan working to feed cooling air to the end portions of the conductor segments.

9. An alternator for a vehicle comprising:
   a rotor;
   a stator disposed around said rotor, said stator including a stator core in which a plurality of slots are formed, the stator core having ends opposed to each other in an axial direction of said stator; and
   a stator winding wound through the slots of the stator core, said stator winding being made up of a plurality of conductor segments, each of the conductor segments including an in-slot portion disposed in one of the slots and an end portion extending from the in-slot portion outside one of the ends of the stator core, the end portions being broken down into at least a first and a second group, each of the end portions of the first group being connected to one of other end portions of the first group through a first joint, each of the end portions of the second group being connected to one of other end portions of the second group through a second joint, each of the first joints being elongated in the axial direction of the stator core to have a length which is 1.5 times or more greater than that of a transverse sectional area of the conductor segments.

10. An alternator as set forth in claim 9, wherein the first group of the end portions connected through the first joints extends further from the stator core than the second group of the end portions connected through the second joints, in the axial direction of the stator core, and wherein a distance between one of opposed ends of each of the first joints closer to an end of the stator core and the end of the stator core is substantially equal to that between one of the opposed ends of each of the second joints closer to the end of the stator core and the end of the stator core.

11. An alternator as set forth in claim 10, further comprising a frame which embraces said stator and to which the stator core of said stator is so secured as to locate the end portions of the conductor segments at a given interval away from a wall of said frame, and wherein joined pairs of the end portions are disposed on the end of the stator core in a plurality of annular arrays so that the first joints lie on one of the annular arrays other than an outermost one.

12. An alternator as set forth in claim 9, further comprising a cooling fan mounted on one of ends of said stator which are opposed to each other in an axial direction of said stator, said cooling fan working to feed cooling air to the end portions of the conductor segments.

13. An alternator for a vehicle comprising:
a rotor;
a stator disposed around said rotor, said stator including a stator core in which a plurality of slots are formed, the stator core having ends opposed to each other in an axial direction of said stator; and
a stator winding wound through the slots of the stator core, said stator winding being made up of a plurality of conductor segments, each of the conductor segments including an in-slot portion disposed in one of the slots and an end portion extending from the in-slot portion outside one of the ends of the stator core, the end portions being broken down into at least a first and a second group, each of the end portions of the first group being connected to one of other end portions of the first group through a first joint, each of the end portions of the second group being connected to one of other end portions of the second group through a second joint, each of the first joints being located at a predetermined interval away from a tip end of at least one of the end portions connected by the each of the first joints.

14. An alternator as set forth in claim 13, wherein each of the first joints is located at a predetermined interval away from tip ends of two of the end portions which are connected by the each of the first joints.

15. An alternator as set forth in claim 13, wherein each of the first joints is located at a predetermined interval away from a tip end of the other of the end portions connected by the each of the first joints.

16. An alternator as set forth in claim 13, wherein one of two of the first group of the end portions connected through one of the first joints extends in an axial direction of the stator core from tips of the second group of the end portions, and wherein a distance between one of opposed ends of each of the first joints closer to an end of the stator core and the end of the stator core is substantially equal to that between one of the opposed ends of each of the second joints closer to the end of the stator core and the end of the stator core.

17. An alternator as set forth in claim 13, further comprising a frame which embraces said stator and to which the stator core of said stator is so secured as to locate the end portions of the conductor segments at a given interval away from a wall of said frame, and wherein joined pairs of the end portions are disposed on the end of the stator core in a plurality of annular arrays so that the first joints lie on one of the annular arrays other than an outermost one.

18. An alternator as set forth in claim 13, further comprising a cooling fan mounted on one of ends of said stator which are opposed to each other in an axial direction of said stator, said cooling fan working to feed cooling air to the end portions of the conductor segments.

19. An alternator for a vehicle comprising:
a rotor;
a stator disposed around said rotor, said stator including a stator core in which a plurality of slots are formed, the stator core having ends opposed to each other in an axial direction of said stator;
a stator winding wound through the slots of the stator core, said stator winding being made up of a plurality of conductor segments, each of the conductor segments including an in-slot portion disposed in one of the slots and an end portion extending from the in-slot portion outside one of the ends of the stator core, the end portions being broken down into at least a first and a second group; and
discrete joining members each of which joins two end portions of the first group of the end portions, each of said joining members including a protrusion working as a radiator fin to dissipate thermal energy from the conductor segments.

20. An alternator as set forth in claim 19, further comprising a frame which embraces said stator and to which the stator core of said stator is so secured as to locate the end portions of the conductor segments at a given interval away from a wall of said frame, and wherein two end portions of the second group of the end portions are joined together, and joined pairs of end portions of the first and second groups of the end portions are disposed on the end of the stator core in a plurality of annular arrays so that the first joints lie on one of the annular arrays other than an outermost one of the annular arrays.

21. An alternator as set forth in claim 19, further comprising a cooling fan mounted on one of ends of said stator which are opposed to each other in an axial direction of said stator, said cooling fan working to feed cooling air to the end portions of the conductor segments.

22. An alternator for a vehicle comprising:
a rotor;
a stator disposed around said rotor, said stator including a stator core in which a plurality of slots are formed, the stator core having ends opposed to each other in an axial direction of said stator; and
a stator winding wound through the slots of the stator core, said stator winding being made up of a plurality of conductor segments, each of the conductor segments including an in-slot portion disposed in one of the slots and an end portion extending from the in-slot portion outside one of the ends of the stator core, each of the end portions including a slant portion and a tip portion, each of the slant portions extending from a corresponding one of the in-slot portions and being oriented both in a circumferential direction and in an axial direction of the stator core, each of the tip portions extending from a corresponding one of the slant portions in the axial direction of the stator core, each of the tip portions having a length made up of a first, a second, and a third section, the first section of each of the tip portions facing substantially parallel to the first section of one of the tip portions and extending over a first distance $l1$ from the slant portion, the second section of each of the tip portions forming a joint to the second section of one of the tip portions and extending over a second distance $l2$, the third section of at least one of two of the tip portions connected through one of the joints extending over a third distance $l3$ from the second section, the first, second, and third distances $l1$, $l2$ and $l3$ meeting a relation of $l3 > l1 + l2$.

23. An alternator as set forth in claim 22, further comprising a frame which embraces said stator and to which the stator core of said stator is so secured as to locate the end portions of the conductor segments at a given interval away from a wall of said frame, and wherein joined pairs of the end portions are disposed on the end of the stator core in a plurality of annular arrays so that the first joints lie on one of the annular arrays other than an outermost one of the annular arrays.

24. An alternator as set forth in claim 22, further comprising a cooling fan mounted on one of ends of said stator which are opposed to each other in an axial direction of said stator, said cooling fan working to feed cooling air to the end portions of the conductor segments.

* * * * *